US012764366B2

(12) United States Patent
Parsons et al.

(10) Patent No.: US 12,764,366 B2
(45) Date of Patent: Oct. 13, 2026

(54) METHOD OF TESTING VIDEO STREAMING AND APPARATUS FOR THE SAME

(71) Applicant: Communications Test Design, Inc., West Chester, PA (US)

(72) Inventors: Matthew Parsons, West Chester, PA (US); John Duttenhofer, West Chester, PA (US); Yifei Xu, Media, PA (US); Drice Bahajak, West Chester, PA (US)

(73) Assignee: Communications Test Design, Inc., West Chester, PA (US)

( * ) Notice: Subject to any disclaimer, the term of this patent is extended or adjusted under 35 U.S.C. 154(b) by 66 days.

(21) Appl. No.: 18/981,822

(22) Filed: Dec. 16, 2024

(65) Prior Publication Data

US 2026/0172615 A1 Jun. 18, 2026

(51) Int. Cl.

| | |
|---|---|
| ***H04N 21/25*** | (2011.01) |
| ***H04H 20/12*** | (2008.01) |
| ***H04N 21/258*** | (2011.01) |
| ***H04N 21/4363*** | (2011.01) |

(52) U.S. Cl.

CPC ...... *H04N 21/25825* (2013.01); *H04H 20/12* (2013.01); *H04N 21/25858* (2013.01); *H04N 21/43637* (2013.01)

(58) Field of Classification Search

None

See application file for complete search history.

(56) References Cited

U.S. PATENT DOCUMENTS

| | | | | |
|---|---|---|---|---|
| 10,574,980 | B1 * | 2/2020 | Batiz | G06T 7/248 |
| 10,757,402 | B2 | 8/2020 | Shwartz et al. | |
| 2005/0144248 | A1 * | 6/2005 | Doganowski | H04N 21/4623 709/208 |
| 2014/0089958 | A1 * | 3/2014 | Nichols | H04N 21/251 725/19 |
| 2014/0309870 | A1 | 10/2014 | Chincisan et al. | |
| 2017/0134757 | A1 | 5/2017 | Xue et al. | |
| 2020/0043484 | A1 * | 2/2020 | Lesso | G10L 15/20 |
| 2021/0076237 | A1 | 3/2021 | Chow et al. | |
| 2025/0379621 | A1 * | 12/2025 | Shen | H04B 7/0608 |

FOREIGN PATENT DOCUMENTS

| | | | |
|---|---|---|---|
| CN | 115118957 | A1 | 9/2022 |
| EP | 4024878 | A1 | 7/2022 |

OTHER PUBLICATIONS

International Search Report from the ISO, Dated Mar. 13, 2026.

* cited by examiner

*Primary Examiner* — Samira Monshi

(74) *Attorney, Agent, or Firm* — Bradley M. Brown

(57) ABSTRACT

A method of testing video streaming and apparatus for the same is shown and described. The method of testing video streaming capabilities of a video streaming device includes streaming a predetermined content to via a video streaming device. Where the predetermined content is a 7/8 color bar display. Capturing the streamed content, comparing the streamed content to predetermined expected results of the stream capture. Determining if the capture matches the expected results by comparing step compares each color bar in the capture to the color bar of the stream to determine streaming capabilities.

16 Claims, 7 Drawing Sheets

METHOD OF TESTING VIDEO STREAMING AND APPARATUS FOR THE SAME

BACKGROUND OF THE INVENTION

Technology is always advancing and has done so at a rapid pace for the last several decades. Technology has become sophisticated, smaller, and accessible across the globe. This has led to technology becoming integral in everyday life. As with any integral element of life, the demand is high. This high demand has led to a rise in the cost of technological devices.

In addition to high demand, the simple replacement of devices can be expensive. If one merely discards older equipment or equipment with minor defects for a brand-new piece the cost can escalate quickly. If, however, technology is upgraded, or repaired this process can be much more cost effective for both the company and consumer.

Many devices are capable of streaming audio and video. These devices must be accurately tested for not only audio but also for the proper video stream. This testing can be significantly tricky for several reasons. When testing audio on a device such as a phone or a pair of headphones, speakers are usually present so in the simplest form one can play a tone and simply listen for it to play. However, many of these streaming devices do not include speakers, let alone a screen to view video streaming.

This presents the issue of how to test video streaming without a screen being attached to the device. One method could include connecting the device to be tested to a television or other type of screen. However, this means that in order to test more than one device at once, multiple screens will be required. Using this method could be either extremely costly, or extremely slow. In addition, if a tester is color blind false test results could be recorded meaning devices could either pass or fail when they should not.

Many companies have been taking advantage of the repair instead of discard philosophy. Further, many consumers are happy purchasing a lightly used and repaired device instead of a brand new one. However, these processes come with new challenges in order to remain effective. Consequently, there is always a need for an improvement in the art.

SUMMARY OF THE INVENTION

The present invention provides a method of testing video streaming and apparatus for the same wherein the same can be utilized for providing convenience for the user when testing a video streaming device. The method of testing a video streaming device includes identifying a device to be tested. Testing the audio stream capabilities of the video streaming device. Testing the video streaming capabilities of the video streaming device. Then Conducting a final check of the tests performed.

Another object of the method for testing the video streaming capabilities of the video streaming device is to test the WiFi capabilities of the video streaming device.

Another object of the method for testing the video streaming capabilities of the video streaming device is to test the blue tooth capabilities of the video streaming device.

Another object of the method for testing the video streaming capabilities of the video streaming device is to identify the device based on the device's serial number.

Another object of the method for testing the video streaming capabilities of the video streaming device is to check the video streaming device's information.

Another object of the method for testing the video streaming capabilities of the video streaming device is to update the video streaming device's software.

Another object of the method for testing the video streaming capabilities of the video streaming device is to conduct a reset of the video streaming device.

Another object of the method for testing the video streaming capabilities of the video streaming device is to test the WiFi capabilities of the video streaming device testing using the steps of:

scanning for a WiFi signal;
determining if there is a WiFi signal received;
capturing the name and strength of the WiFi signal received;
comparing the name and strength of the receive WiFi signal to the signal.

Another object of the method for testing the video streaming capabilities of the video streaming device is to test the audio streaming capabilities of the video streaming device testing using the steps of:

sending audio content to the video streaming device;
streaming the audio content;
capturing the audio content;
comparing the KHz level of the captured audio content to an expected KHz level.

Another object of the method for testing the video streaming capabilities of the video streaming device is to test the video streaming capabilities of the video streaming device testing using the steps of:

capturing the streamed content;
comparing the streamed content to predetermined expected results of the stream capture;
determining if the capture matches the expected results.

Another object of the method for testing the video streaming capabilities of the video streaming device is to have the predetermined content be a 7/8 color bar display.

Another object of the method for testing the video streaming capabilities of the video streaming device is to compare the pixel count of the captured streamed content to a pixel count of the video streaming device.

Another object of the method for testing the video streaming capabilities of the video streaming device is to the comparing step compares each color bar in the capture to the color bar of the stream to determine streaming capabilities.

Another object of the method for testing the video streaming capabilities of the video streaming device is to test the Bluetooth capabilities of the video streaming device testing using the steps of:

scanning for a Bluetooth signal;
determining if there is a Bluetooth signal received;
capturing the name and strength of the Bluetooth signal received;
comparing the name and strength of the receive Bluetooth signal to the signal.

Another object of the method for testing the video streaming capabilities of the video streaming device is simultaneously test the audio and video streaming capabilities of the video streaming device testing using the steps of:

sending a combined audio video/file to the video streaming device;
streaming the audio/video file via the video streaming device;
capturing the steam;
comparing the capture to the original audio video file.

Other objects, features and advantages of the present invention will become apparent from the following detailed description taken in conjunction with the accompanying drawings.

BRIEF DESCRIPTION OF THE DRAWINGS

The accompanying drawings are incorporated in and are to be considered part of the present specification. These drawings are meant to aid the reader's understanding and comprehension of the present disclosure and are depictions of various example embodiments. The drawings are not to be considered limiting upon the disclosure. It should specifically be noted that the drawings are examples and may not necessarily be drawn to scale.

DETAILED DESCRIPTION OF THE INVENTION

For the purposes of presenting a brief and clear description of the present invention, a preferred embodiment will be discussed as used for the method of testing video streaming and apparatus for the same. The figures are intended for representative purposes only and should not be considered to be limiting in any respect.

Figure 1:
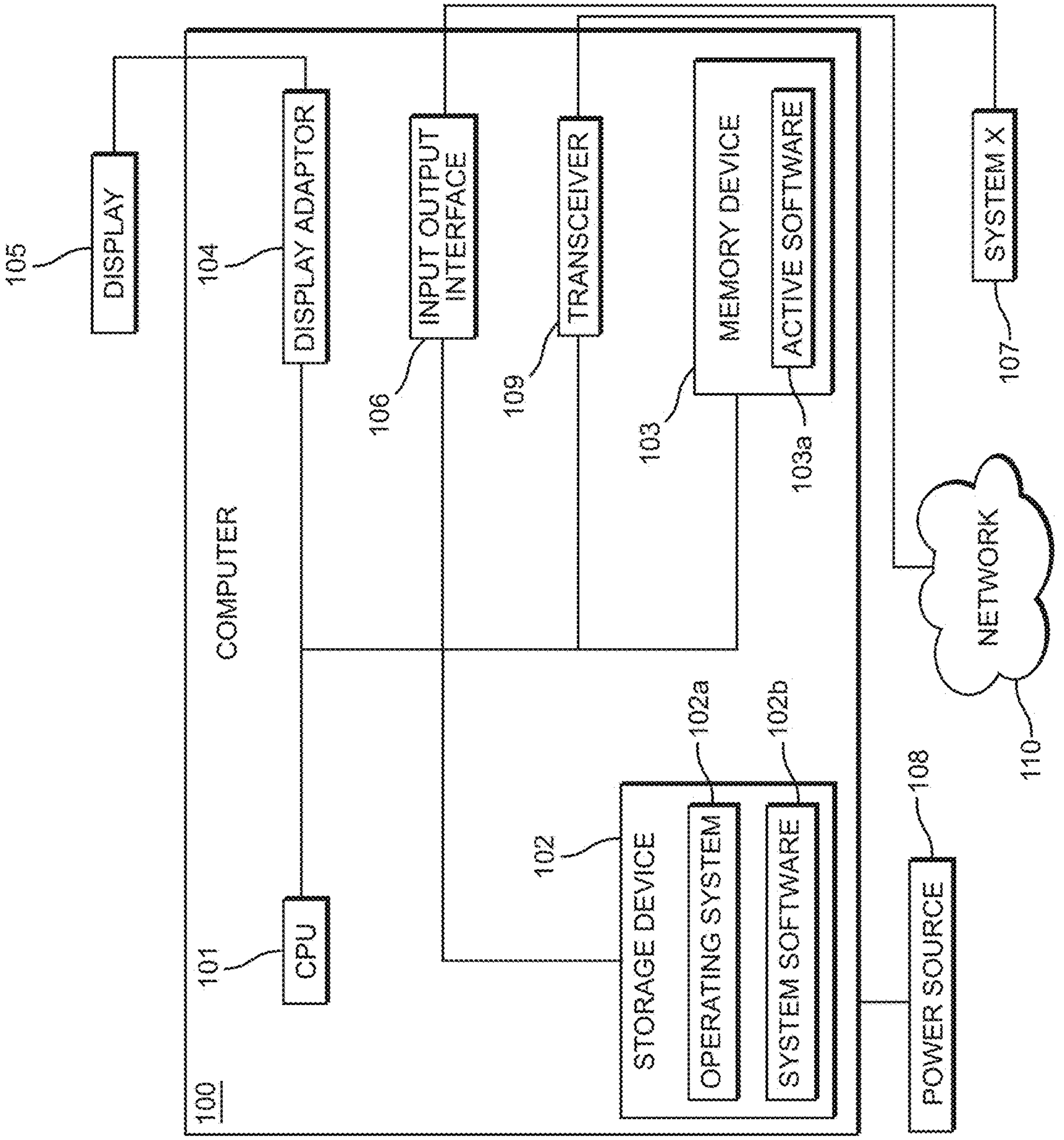
FIG. 1 shows a block diagram of an embodiment of a computing system for use with the system for sorting items.

Referring now to FIG. 1, there is shown block diagram of an embodiment of a computing system for use with the system for sorting items. Computing systems may have many interchangeable parts or multiples of some parts. One of ordinary skill in the art will understand that the shown computer 100 is a basic computing system demonstrating a minimal amount of parts to allow for the computer to function. Computer 100 is exemplary, and one of ordinary skill in the art will recognize that computer 100 may be altered as necessary to render the presently disclosed system operable or to provide a peak performance of the disclosed system.

The parts described are each operably coupled together as necessary, one of ordinary skill in the art will understand how to connect general computer components, for example by use of a mother board or other computer board. In the shown embodiment the computer 100 includes a CPU 101. In one embodiment the CPU 101 includes only one processor. In other embodiments the CPU 101 may be made up of multiple processors. Different processors will allow for different computing power and speed.

The computer 100 includes at least one storage device 102. In different embodiments the at least one storage device 102 may be a solid-state storage device, a disk storage device, or another suitable storage device. One of ordinary skill in the art will recognize that there are several types of computing storage devices each providing well-known benefits and drawbacks. The at least one storage device 102 will store at least the computer operating system 102*a* and system software 102*b*. System software 102*b* may include any software necessary, or optionally, used to run any system described herein.

The computer 100 will have at least one memory device 103. One of ordinary skill in the art will recognize that there are several types of computing memory devices each providing well known benefits and drawbacks. The at least one memory device 103 will store at any active software 103*a*. Active software 103*a* may include the operating system 102*a* or parts of the system software 102*b*. The at least one memory device 103 may store the entire system software 102*b* size and speed permitting.

The computer 100 may also include various connection ports and types. The computer 100 may have a display adaptor 104. The display adaptor 104 will allow the computer 100 to connect to at least one display 105. In other embodiments multiple displays may be connected to the display adaptor 104. Similarly, the computer 100 may include at least one input/output interface 106. The input/output interface 106 will allow the computer 100 to connect to at least one system, referred to as System X 107 in FIG. 1. The input/output interface 106 may also allow for connection to only part of System X 107 or multiple systems. The computer 100 will also be operably connected to a required power source 108.

In some embodiments System X 107 can include a number of the following items. In one embodiment a printer 107*a* is included as part of System X 107. In the embodiment discussed below the printer is at least capable of printing labels, however, other printers can be used. In another embodiment System X 107 includes a unique circuit board 107*e*. The circuit board 107*e* can be used to allow for modularity of the present system. At least one rack 107*b* can be operably coupled to the circuit board 107*e*. In this instance the rack 107*b* is referring to the electrical components of the rack 107*b*. In yet a further embodiment a plurality of lights 107*c* are electrically couple to the rack 107*b*. As discussed herein the lights may be alone or secured within a pressable button. In some embodiments a scanner 107*d* is connected to System X 107. The scanner 107*d* will at least in part be able to scan barcodes and/or QR codes.

The computer 100 may also include a transceiver 109. In one embodiment the transceiver 109 is a wired transceiver. In another embodiment the transceiver 109 is a wireless transceiver. The transceiver 109 will allow the computer 100 to connect to a network 110. The network 110 may be an internet or an intranet connection. The network 110 will allow for the computer 100 to potentially connect to multiple other computing devices. In another embodiment the network may allow for the computer 100 to connect to multiple systems. In one embodiment the computer 100 will allow for System X 107 to be connected to the network 110.

Figure 2:
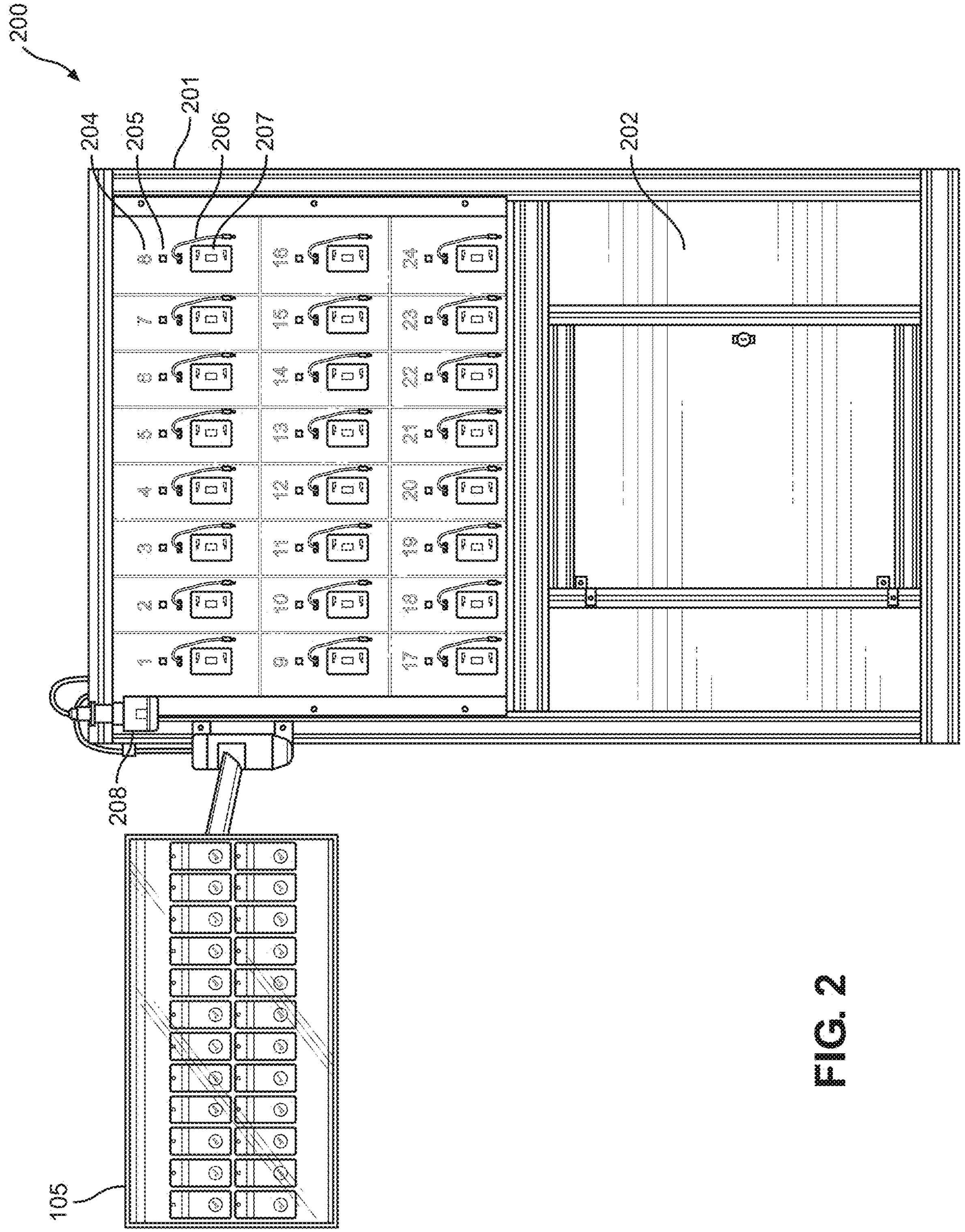
FIG. 2 shows a perspective view of an embodiment of an apparatus for testing video streaming devices.

Referring now to FIG. 2, there is shown a perspective view of an embodiment of an apparatus for testing video streaming devices. In some embodiments the method for testing video streaming is conducted using a specialized apparatus. In one of these embodiments the apparatus for testing video streaming 200 includes a frame 201 and a plurality of sidewalls 202 creating an interior volume. The interior volume is sized to hold various system components such as those described in the description of FIG. 3. At least some of the system components are secured to at least one of the sidewalls 202.

In the shown embodiment one of the sidewalls includes 24 test stations 203. In this embodiment each test station 203 includes a numeral 204 representing the station. Each test station 202 includes an LED light 205. In some embodiments the LED light 205 is a multi-color light. This will allow different colors to be displayed, which in some embodiments can be used to send different messages to a potential operator.

Each test station 203 can have various connection point depending on devices to be tested. In the shown embodiment there is a micro USB connection 206. In one embodiment the micro USB connection 206 can be used to supply power to the device to be tested. Another potential connection type which is used in the shown embodiment is an HDMI connection 207. At the time of this filing an HDMI connection 207 is one of the most prevalent video streaming connections. However, in different embodiments various other connectors can be used such as USB-C, Mini DisplayPorts, DisplayPorts, mini and Micro HDMI, and DVI type connectors could all be used for similar results.

In many embodiments a screen 105 is connected to the frame 201. In different embodiments the screen may double as a Human Machine Interface including the ability to have inputs via touch screen or other machine interface tools. The screen can be used to display test status and results as described in the description of FIG. 4 and FIG. 4A. In one embodiment a scanner 208 is also secured to the frame 201. The scanner 208 will allow for barcodes to be scanned and test device information to be quickly added to the system for testing.

Figure 3:
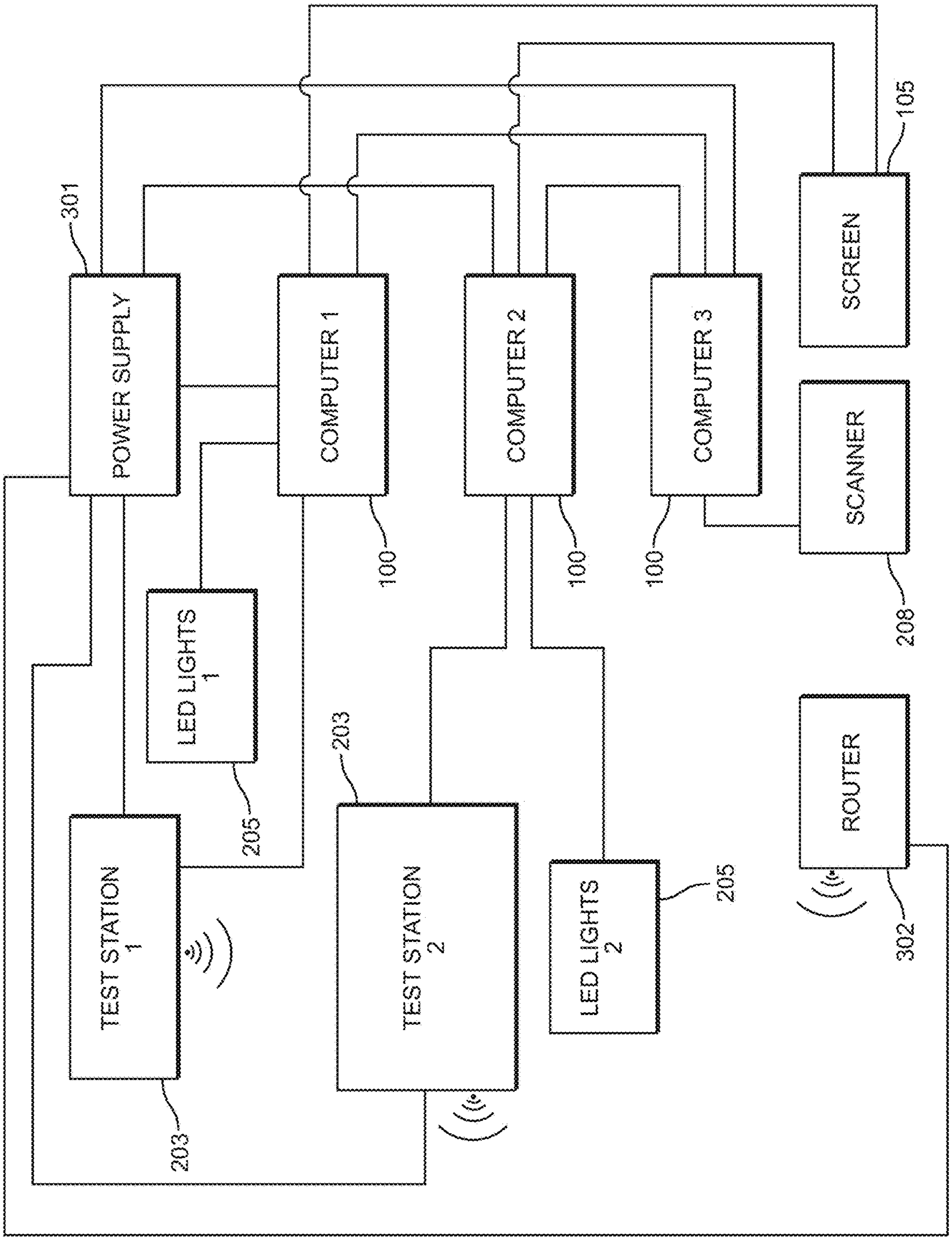
FIG. 3 shows a wiring diagram of an embodiment of the apparatus for testing video streaming devices.

Referring now to FIG. 3, there is shown a wiring diagram of an embodiment of the apparatus for testing video streaming devices. Various components and/or numbers of components can be used to produce the similar results of the method as described herein. For example, the testing of a single device at one time will not require duplicate components as described herein. However, the shown embodiment allows for the testing of multiple devices at one time.

In the shown embodiment, there are 24 test stations 203. The test stations 203 are split into two sets of 12. There is at least one computer 100 used to operate the test stations. In the shown embodiment there are three computers 100. Computer 1 and computer 2 are operably coupled to computer 3. Computer 3 is used as the managing computer to dictate tests to be performed to the test stations 203. A power supply 301 is operably coupled to each of the computers 100.

In addition the power supply 301 is operably coupled to each of the test stations 203. Computer 1 is operably coupled to a first set of testing stations (test station 1) 203. Computer 2 is operably coupled to a second set of testing stations (test station 2) 203. A first set of LED lights (LED lights 1) 205 are operably coupled to computer 1. A second set of LED lights (LED lights 2) 205 are operably coupled to computer 2. These LED lights 205 are associated with the appropriate test station 203. Computer 3 is operably coupled with the scanner 208.

A router 302 is operably coupled with the power supply 301. The router wirelessly sends a signal to the surrounding area which can be received by the test stations 203. This will allow for wireless signal testing even if there is no other signal in the area.

Figure 4:
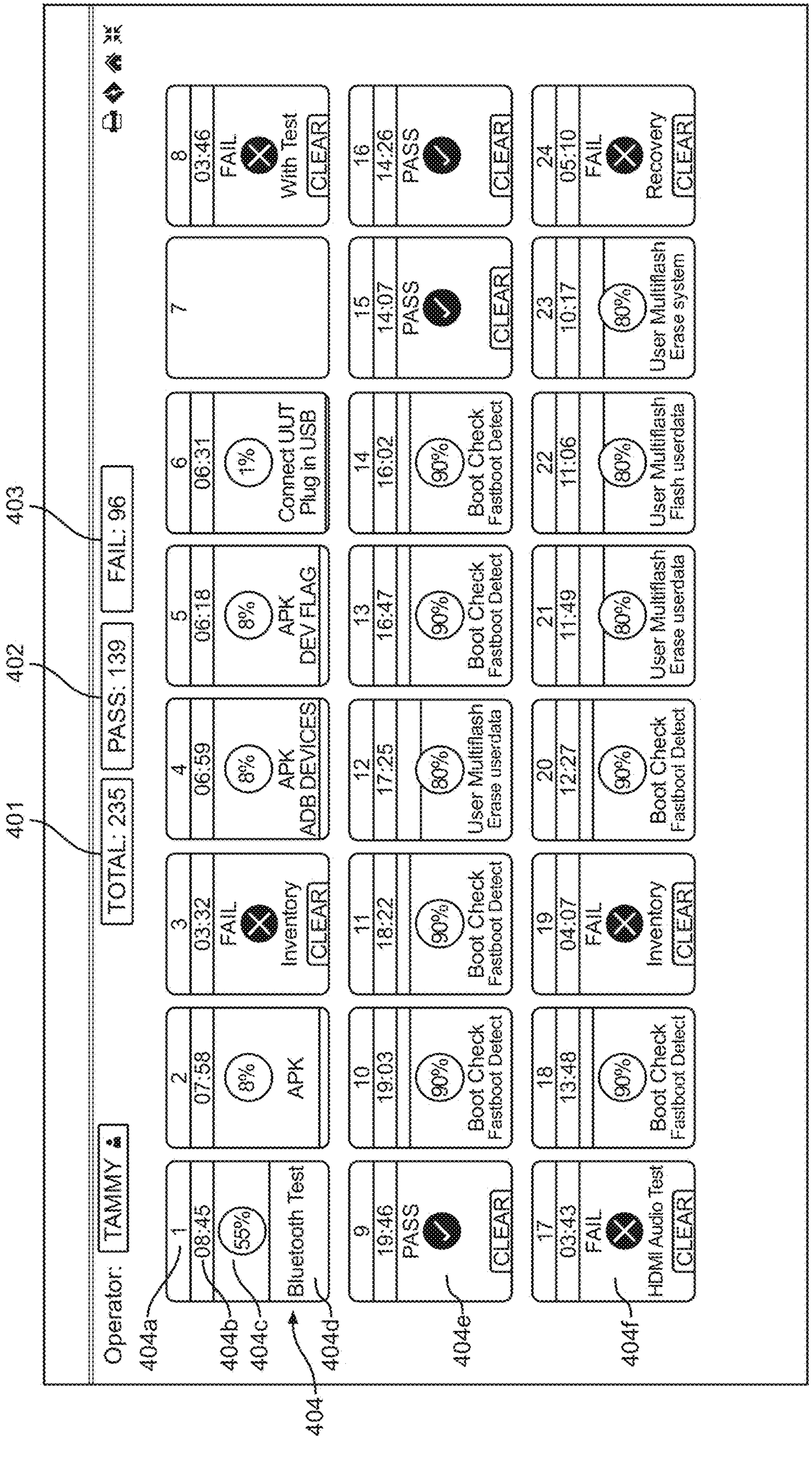
FIG. 4 shows a perspective view of an embodiment of a GUI for the apparatus for testing video streaming devices.
Figure 4A:
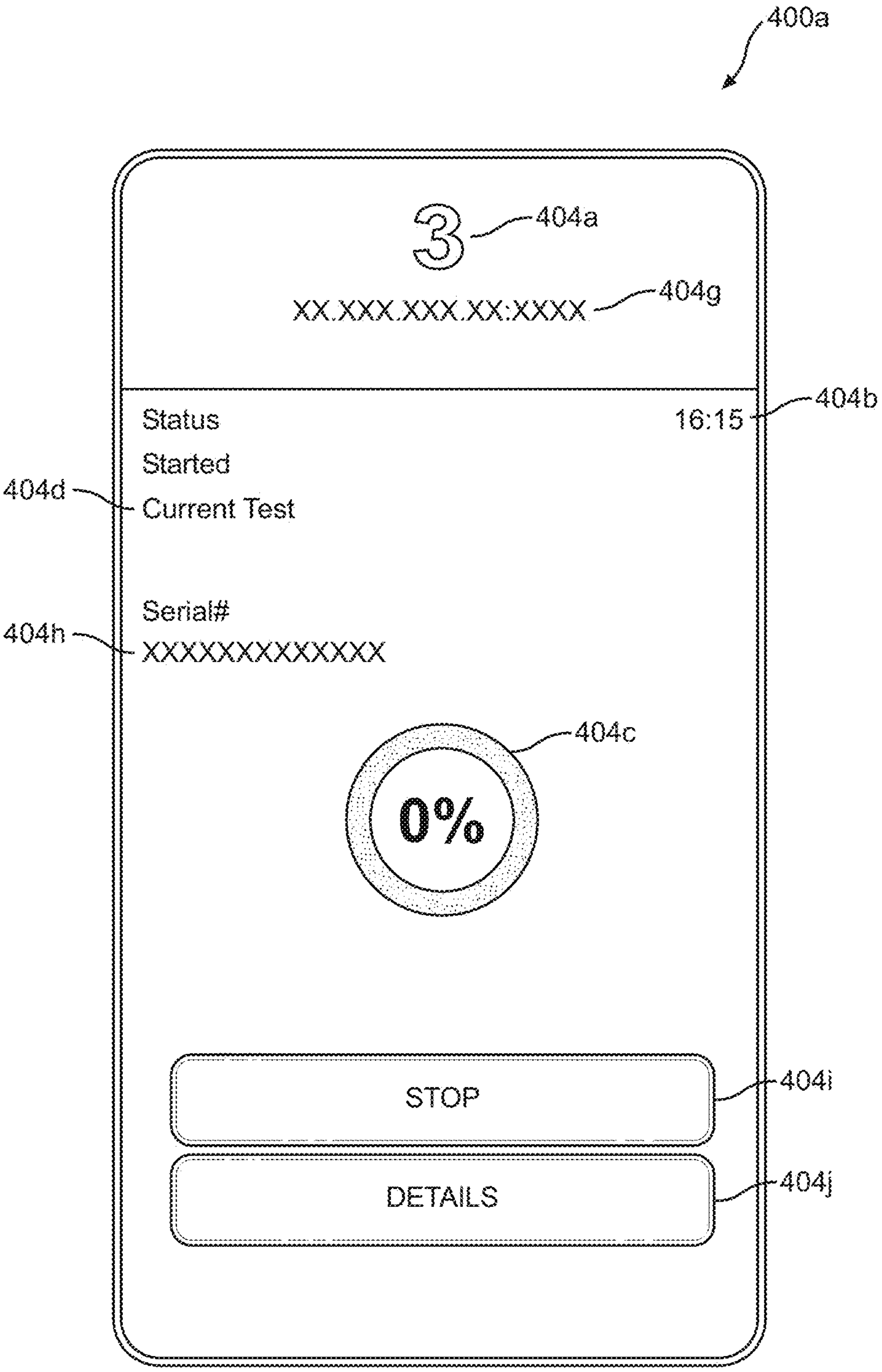
FIG. 4A shows a zoomed view of an embodiment of a GUI for the apparatus for testing video streaming devices.

Referring now to FIG. 4 and FIG. 4A, there is shown a perspective view of an embodiment of a GUI for the apparatus for testing video streaming devices. In one embodiment the GUI for the video streaming test apparatus includes a series of line items for: the total devices tested 401, the total number of passed devices 402, and the total number of failed devices 403. In one embodiment these line items are tabulated based on a current test session. In another embodiment these line items are tabulated based on the total number of devices tested over the apparatus's life.

The shown GUI has a mini information window 404 for each of the test stations. Each mini information window 404 includes the station number 404*a*, the test time 404 *b*, the test completion percentage 404 *c*, and the test type being performed 404*d*. After the test series is completed the mini information window 404 may change to show other statuses. For example, the test pass status 404*e*, or the test's fail status 404*f*. If the device fails a test the test that was being performed 404*d*. In other embodiments the mini information window 404 may display statuses such as, but not limited to, stopped, sideline, or manual test. After the testing is completed, pass or fail, a clear button is displayed to wipe current test data and start a new device for testing.

In some embodiments if a mini information window 404 is selected, then a zoomed view GUI 400*a* is shown. In addition to the items discussed above the zoomed view GUI 400 *a* also shows an IP Address 404*g* for the station. Further, the devices serial number 404*h* is shown. From here the testing sequence can be stopped via the stop button 404*i*. In some embodiments a further button 404*j* is shown which will allow for additional device details to be displayed. These details can vary and various users will want to have various details displayed.

Figure 5:
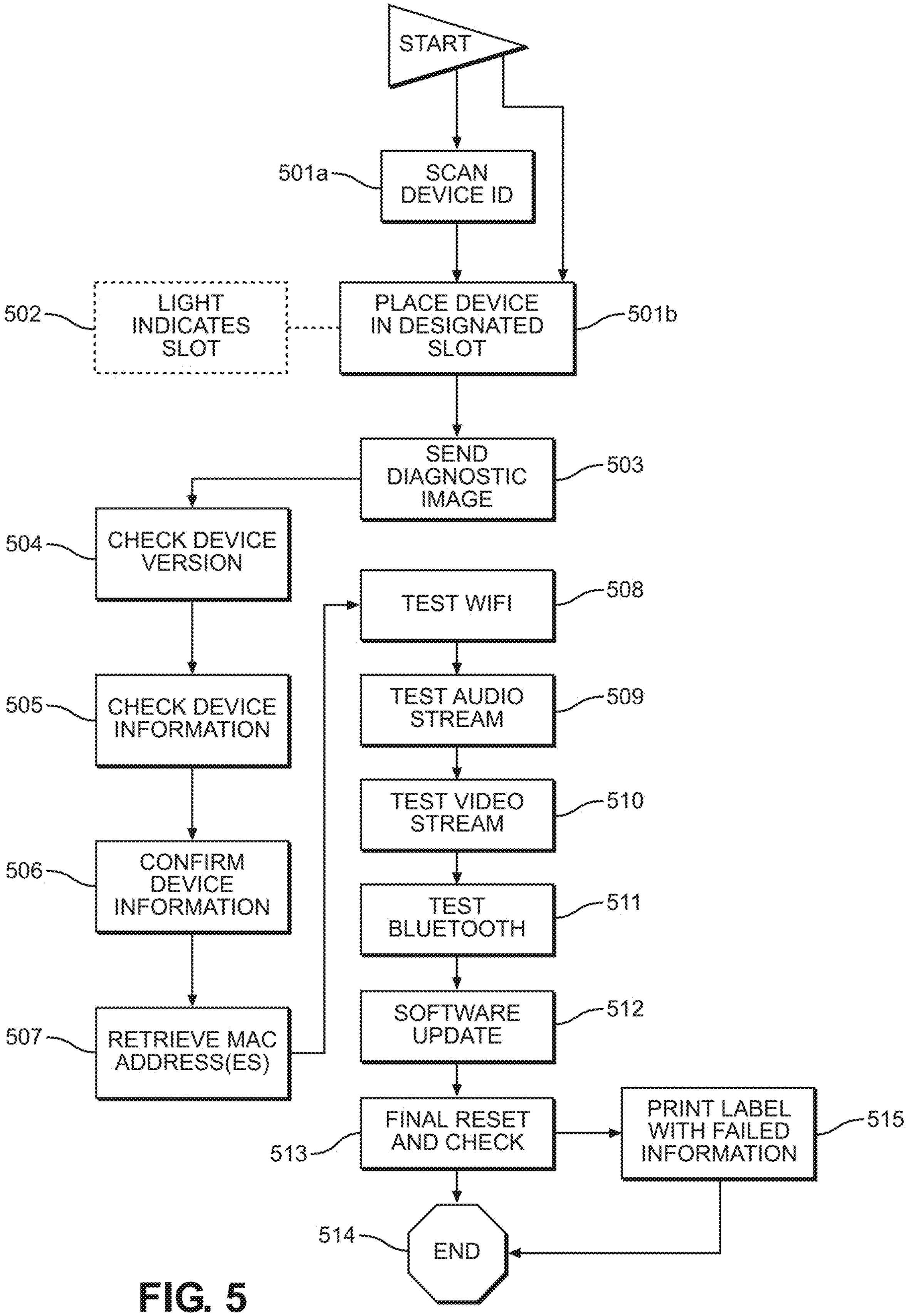
FIG. 5 shows a flow chart of an embodiment of a method for testing video streaming devices.

Referring now to FIG. 5, there is shown a flow chart of an embodiment of a method for testing video streaming devices using the apparatus. The method for testing a video streaming device using the apparatus for testing video streaming devices may begin by scanning a device ID into the system 501*a*. In one embodiment after the device ID is scanned 501*a* an LED light can illuminate 502 to show which slot to place the device into. Then the video streaming device is place in a designated spot 501*b*. In some embodiments the method may begin by placing the streaming device into the slot and no scanning is required.

After the streaming device is correctly connected to the testing apparatus the testing phase begins by sending a diagnostic image to the streaming device 503. In some embodiments the first several steps involve checking the device version and software. For example, the method first checks the streaming devices version 504. The device version can be used to ensure proper functional tests are performed. Next device information is checked 505. Device information can include, a devices serial number, memory stats (read, write, available, buffers, catch, etc), device lifetime statistics (resets, partition reconfigurations, etc), other device statistics (is HDCP working, is fairplay and freeview-play on, is the device unlocked, functional name and id's). In embodiments where the device ID is scanned into the system the devices information can be confirmed 506. After the device information is confirmed 506 the devices MAC address is recorded 507.

After the devices version and information is checked and logged the functional tests begin. In the shown embodiment the first functional test it to test the WiFi connectivity 508. In one embodiment the WiFi can be tested by sending a command to the video streaming device to do a wide/broad scan of the signals in the area. Reviewing the response of the signal scan. In one embodiment if a response is received the test is passed. In another embodiment the signal name and strength are compared against expected results and the test is only passed if the signal name and strength match the expected results. If no response is received, the test fails. Next the device's audio streaming is tested 509. In one embodiment audio streaming can be tested by playing a predetermined audio through the streaming device and capturing the same. In this embodiment the KHz of the streamed audio can be compared to an expected KHz level, if the streamed audio KHz is within predetermined threshold then the test is passed.

The video streaming capability of the streaming device is then tested 510. This test is conducted as described in the description of FIG. 6. After the video streaming test the Bluetooth capability is tested 511. In one embodiment the Bluetooth capabilities can be tested by sending a command to the video streaming device to do a wide/broad scan of the signals in the area. Reviewing the response of the signal scan. In one embodiment if a response is received the test is passed. In another embodiment the signal name and strength are compared against expected results and the test is only passed if the signal name and strength match the expected results. If no response is received, the test fails. In one embodiment the entire function testing sequence is completed. In another embodiment if any of the functional tests fail the device is failed and the testing stops. Each of these methods have benefits, one produces a totality of results and one can test devices quicker.

After the functionality testing the streaming device's software is update to the most recent version 512. Then the device is factory reset 513. In one embodiment the reset is checked to ensure the device has been reset and wiped of any potential original customer data. In one embodiment the testing ends 514. In another embodiment a final label is printed for the streaming device 515. This label can include any test failure data. After which time the testing sequence ends 514.

Figure 6:
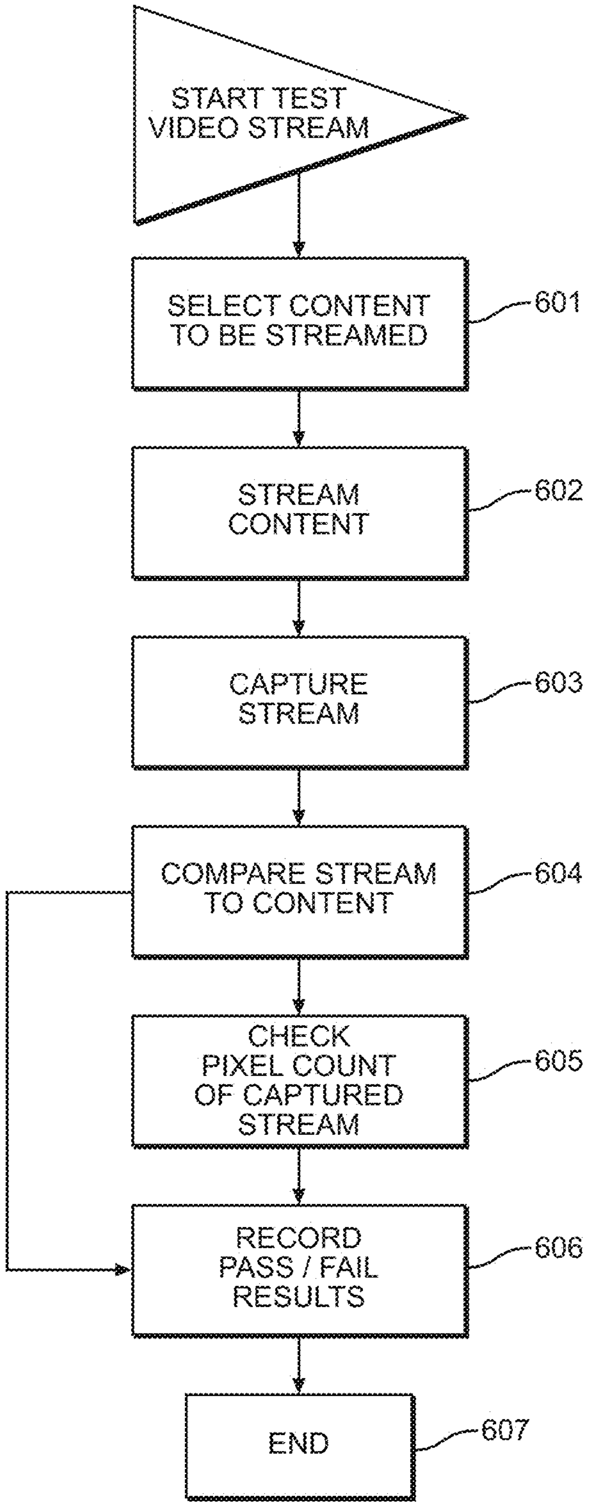
FIG. 6 shows a flow chart of an embodiment of a method for testing video streaming devices.

Referring now to FIG. 6, there is shown a flow chart of an embodiment of a method for testing video streaming devices. The method for testing video streaming starts by selecting content to be streamed 601. In one embodiment this content could be a video loop. In another embodiment this could be a 7 or 8 color bar image. Next the content is streamed from the video streaming device 602. The stream is then captured by a computer which is connected to the video streaming device 603.

The captured stream is compared to the predetermined stream content 604. In one embodiment this comparison is conducted by taking a single captured frame of the stream and calculating the RGB values of the capture. These RGB values are then compared to the predetermined streamed content. If the values are within a predetermined range then the device passes the test. In one embodiment the pass/fail results are recorded and or displayed 606 and the test method ends 607.

In another embodiment the pixel count of the streamed capture is counted 605. In this embodiment device data is at least partially captured to determine the maximum pixel streaming capability of the device. The pixel count is then compared to the streaming capability. If the pixel count is within a predetermined range then the device passes the pixel count test. In this embodiment the pass/fail results are then recorded and or displayed 606 and the test method ends 607.

In one embodiment the video stream testing as shown in FIG. 6 and the audio stream testing in FIG. 5 reference number 509 can be conducted at the same time. In this embodiment the predetermined stream content is a combination audio/video file. The methods will otherwise work similarity to if the audio and video files are sent separately. One or ordinary skill in the art will understand how to separate out the stream types once captured if needed.

It is therefore submitted that the methods, systems, and devices have been shown and described in what is considered the most practical and preferred embodiments along with specific examples. It is recognized, however, that departures may be made within the scope and these present examples are not intended to be limiting. One of ordinary skill the art will be able to discern that obvious modifications can be made without departing from the scope or spirit.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. Similarly, it is to be realized that, it is not intended for any method set forth herein to be construed as requiring that its steps be performed in a specific order, unless otherwise set forth in the claims.

Therefore, the foregoing is considered as illustrative only of the principles of the disclosure. Further, since numerous modifications and changes will readily occur to those skilled in the art, it is not desired to limit the invention to the exact construction and operation shown and described, and accordingly, all suitable modifications and equivalents may be resorted to, are deemed to fall within.

The invention claimed is:

1. A method of testing a video streaming device, the method comprising:
- identifying a device to be tested;
- testing audio stream capabilities of the video streaming device;
- testing video streaming capabilities of the video streaming device;
- wherein testing the video streaming capabilities of the video streaming device is comprised of:
  - streaming a predetermined content via a video streaming device;
  - capturing the streamed predetermined content, wherein the predetermined content is a 7/8 color bar display;
  - comparing the streamed predetermined content to predetermined expected results of a stream capture;
  - determining if the capture matches the expected results;
- conducting a final check of the tests performed.

2. The Method of claim 1, further comprising testing the WiFi capabilities of the video streaming device.

3. The Method of claim 1, further comprising testing the Bluetooth blue tooth capabilities of the video streaming device.

4. The Method of claim 1, further comprising identifying the device based on the device's serial number.

5. The method of claim 1, further comprising checking the video streaming device's information.

6. The method of claim 1, further comprising updating the video streaming device's software.

7. The method of claim 1 further comprising conducting a reset of the video streaming device.

8. The method of claim 2 wherein testing the WiFi capabilities of the video streaming device is comprised of:
- scanning for a WiFi signal;
- determining if there is a WiFi signal received;
- capturing the name and strength of the WiFi signal received;
- comparing the name and strength of the receive WiFi signal to the signal.

9. The method of claim 1 wherein testing the audio stream capabilities of the video streaming device is comprised of:
- sending audio content to the video streaming device;

streaming the audio content;

capturing the audio content;

comparing the KHz level of the captured audio content to an expected KHz level.

10. The method of claim 1 further comprising comparing the pixel count of the captured streamed content to a pixel count of the video streaming device.

11. The method of claim 1 wherein the comparing step compares each color bar in the capture to the color bar of the stream to determine streaming capabilities.

12. The method of claim 3 wherein testing the blue tooth capabilities of the video streaming device is comprised of:

scanning for a Bluetooth signal;

determining if there is a Bluetooth signal received;

capturing the name and strength of the Bluetooth signal received;

comparing the name and strength of the receive Bluetooth signal to the signal.

13. The Method of claim 1, wherein testing the audio streaming capabilities and the video stream capabilities is comprised of sending a combined audio video/file to the video streaming device;

streaming the audio/video file via the video streaming device;

capturing the streamed audio/video file;

comparing the captured the streamed audio/video file to an original audio video file.

14. A method of testing video streaming capabilities of a video streaming device, the method comprising:

streaming a predetermined content via a video streaming device;

wherein the predetermined content is a 7/8 color bar display;

capturing the streamed predetermined content;

comparing the streamed predetermined content to predetermined expected results of the stream capture;

determining if the captured the streamed predetermined content matches the expected results.

15. The method of claim 14 further comprising comparing the pixel count of the captured streamed content to a pixel count of the video streaming device.

16. The method of claim 14 wherein the comparing step compares each color bar in the capture to the color bar of the stream to determine streaming capabilities.

* * * * *